(12) United States Patent
Wang et al.

(10) Patent No.: US 10,504,511 B2
(45) Date of Patent: Dec. 10, 2019

(54) CUSTOMIZABLE WAKE-UP VOICE COMMANDS

(71) Applicant: Midea Group Co., Ltd., Foshan (CN)

(72) Inventors: Dongyan Wang, San Jose, CA (US);
Haisong Gu, Cupertino, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 128 days.

(21) Appl. No.: 15/658,357

(22) Filed: Jul. 24, 2017

(65) Prior Publication Data
US 2019/0027138 A1    Jan. 24, 2019

(51) Int. Cl.
| | |
|---|---|
| *G10L 15/22* | (2006.01) |
| *G10L 15/02* | (2006.01) |
| *G10L 25/18* | (2013.01) |
| *G10L 15/18* | (2013.01) |
| *G10L 15/06* | (2013.01) |
| *G06F 3/16* | (2006.01) |

(Continued)

(52) U.S. Cl.
CPC .............. *G10L 15/22* (2013.01); *G06F 3/167* (2013.01); *G10L 15/02* (2013.01); *G10L 15/06* (2013.01); *G10L 15/1815* (2013.01); *G10L 25/18* (2013.01); *G10L 17/00* (2013.01); *G10L 2015/088* (2013.01); *G10L 2015/223* (2013.01); *G10L 2015/227* (2013.01)

(58) Field of Classification Search
CPC .............. G10L 15/22; G10L 2015/223; G10L 2015/088; G10L 15/30; G06F 3/167
See application file for complete search history.

(56) References Cited

U.S. PATENT DOCUMENTS

| | | | |
|---|---|---|---|
| 6,963,759 B1 | 11/2005 | Gerson | |
| 10,074,371 B1 * | 9/2018 | Wang | ............ G10L 15/22 |

(Continued)

FOREIGN PATENT DOCUMENTS

| | | |
|---|---|---|
| CN | 104538030 A | 4/2015 |
| CN | 104715754 A | 6/2015 |

(Continued)

OTHER PUBLICATIONS

PCT International Search Report and Written Opinion, PCT Application No. PCT/CN2018/090062, dated Sep. 10, 2018, nine pages.

*Primary Examiner* — Richemond Dorvil
*Assistant Examiner* — Mark Villena
(74) *Attorney, Agent, or Firm* — Morgan, Lewis & Bockius LLP

(57) ABSTRACT

A voice command module is used to execute voice commands in a residential environment that contains a plurality of home devices. The voice command module includes a speech recognition module and command logic. The speech recognition module receives utterances from users and converts the utterances to commands from a vocabulary of predetermined commands, which includes a customization command to define a new wake-up utterance as corresponding to a wake-up command. The command logic executes the commands. When the customization command is received, the command logic changes the voice command module so that it now executes the wake-up command upon detection of the new wake-up utterance.

25 Claims, 4 Drawing Sheets

(51) Int. Cl.
   *G10L 15/08*          (2006.01)
   *G10L 17/00*          (2013.01)

(56) References Cited

U.S. PATENT DOCUMENTS

| | | | |
|---|---|---|---|
| 2013/0226591 A1* | 8/2013 | Ahn | G06F 3/167 |
| | | | 704/275 |
| 2013/0325484 A1 | 12/2013 | Chakladar et al. | |
| 2015/0154953 A1* | 6/2015 | Bapat | G10L 15/06 |
| | | | 704/251 |
| 2015/0154976 A1* | 6/2015 | Mutagi | H04L 12/281 |
| | | | 704/275 |
| 2015/0302850 A1 | 10/2015 | Lebrun | |
| 2016/0343376 A1* | 11/2016 | Cai | G10L 17/22 |
| 2017/0242657 A1* | 8/2017 | Jarvis | G06F 3/167 |
| 2017/0345422 A1* | 11/2017 | Yang | G06F 3/167 |
| 2018/0040324 A1* | 2/2018 | Wilberding | G10L 15/30 |
| 2018/0158449 A1* | 6/2018 | Tang | G10L 15/187 |
| 2018/0174581 A1* | 6/2018 | Wang | G10L 15/22 |
| 2018/0177029 A1* | 6/2018 | Wang | H05B 37/0236 |
| 2018/0341643 A1* | 11/2018 | Alders | G10L 13/033 |
| 2018/0350360 A1* | 12/2018 | Knudson | G10L 15/22 |
| 2019/0020493 A1* | 1/2019 | Arling | H04L 12/282 |

FOREIGN PATENT DOCUMENTS

| | | |
|---|---|---|
| CN | 105677004 A | 6/2016 |
| CN | 106448664 A | 2/2017 |
| CN | 106662932 A | 5/2017 |

\* cited by examiner

CUSTOMIZABLE WAKE-UP VOICE COMMANDS

BACKGROUND

1. Technical Field

This disclosure pertains in general to voice controlled devices.

2. Description of Related Art

Voice-based user interfaces are becoming more ubiquitous. Voice-based user interfaces allow natural communication between humans and devices via voice commands. One challenge to using voice commands is that devices must determine whether detected speech is intended as a voice command for the device. Conventionally, users first enable a device to receive voice commands before giving the voice commands. For example, a user presses a button or clicks on an icon to trigger a device to be ready to receive voice commands. However, using rigid non-voice interaction impedes the user experience. Alternately, the device must be ready at all times to receive voice commands, which is not efficient.

SUMMARY

The present disclosure overcomes the limitations of the prior art by providing functionality to customize wake-up utterances.

In one implementation, a voice command module is used to execute voice commands in a residential environment that contains a plurality of home devices. The voice command module includes a speech recognition module and command logic. The speech recognition module receives utterances from users and converts the utterances to commands from a vocabulary of predetermined commands, which includes a customization command to define a new wake-up utterance corresponding to a wake-up command. The command logic executes the commands. When the customization command is received, the command logic changes the voice command module so that it now executes the wake-up command upon detection of the new wake-up utterance. The voice command module may further include an intent recognition module. The intent recognition module recognizes users' intent and generate commands based on the recognized intent. The commands trigger a home device and/or a command hub to respond appropriately to the recognized intent. The home device and/or command hub can respond as if the user has already issued commands.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Wake-up utterances are individual words or phrases used to trigger a device to be ready to execute commands. Wake-up utterances correspond to a wake-up command. For example, a user utters a wake-up utterance along with another voice command, and a device responds by waking up (i.e., executing a wake-up command) and then executing the voice command. Typically, a particular device is configured (e.g., hardcoded) with a predetermined wake-up utterance to trigger the device to wake up. This is because using predetermined wake-up commands can prevent devices from responding unpredictably. However, because of this, users cannot select user-specific wake-up utterances. As further described below, embodiments described herein allow users to customize wake-up utterances.

Figure 1:
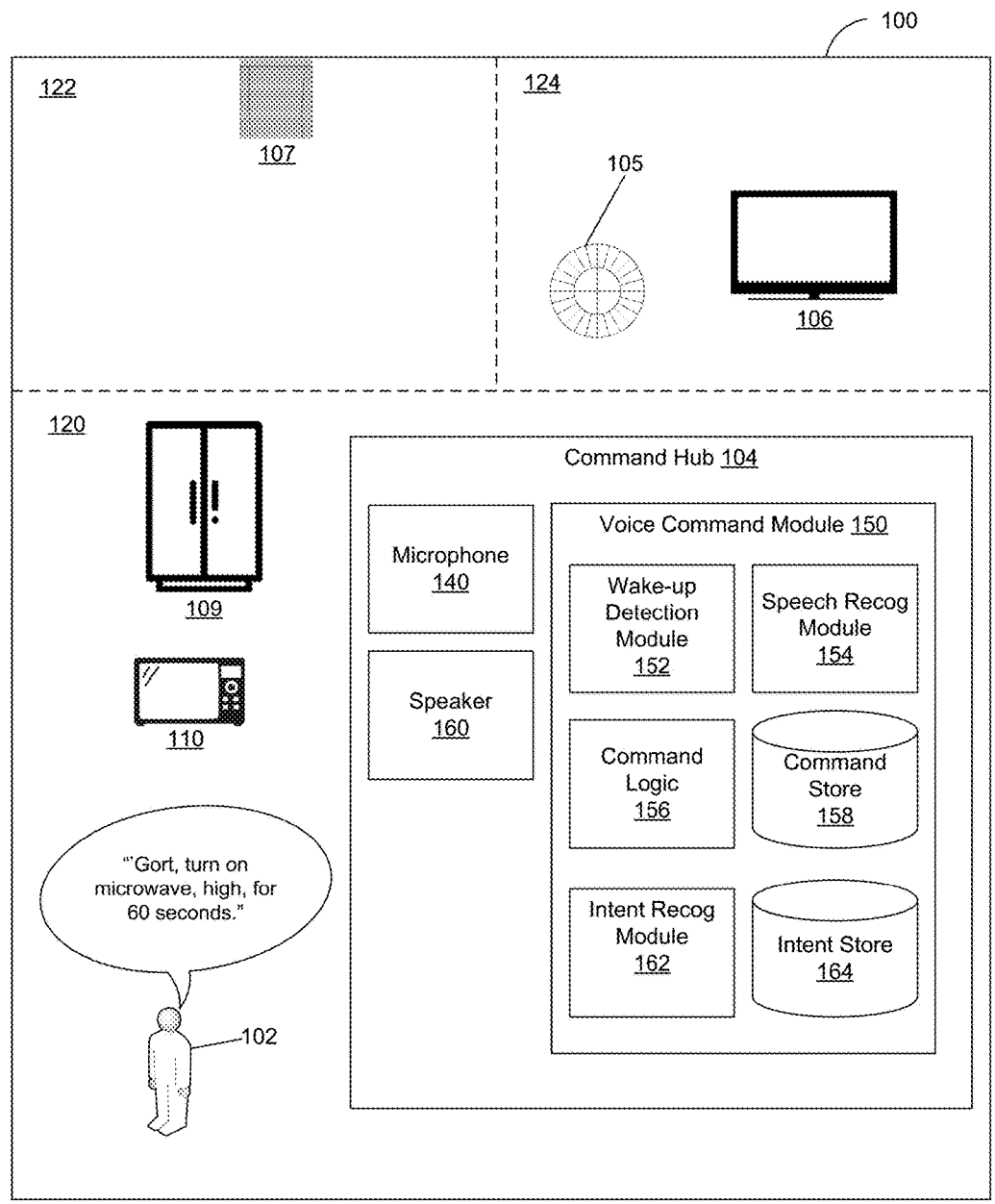
FIG. 1 illustrates an example voice-controlled residential environment, according to one embodiment.

FIG. 1 illustrates an example voice-controlled residential environment, according to one embodiment. In the illustrated example, an individual 102 utters "'Gort, turn on microwave, high for 60 seconds." to instruct a command hub 104 to turn on a microwave 110. The wake-up utterance "Gort" has been customized by the individual 102 and activates the command hub 104 to process the individual's voice input and respond to the individual's voice commands. After detecting the speech "Gort", the command hub 104 interprets the voice input, recognizes the command "turn on microwave," and responds to the command by turning on the microwave 110. A "command hub" is also referred to herein as a "hub".

The hub 104 is not always activated. In a low power mode (also known as a stand-by mode or a sleep mode), one or more modules of the hub 104 and other home devices are off. As one example, in a low power mode, the hub 104 cannot interpret voice input or respond to commands, other than detecting the wake-up utterance and/or recognizing users' intent. As described herein, being activated refers to a state in which the hub 104 converts voice input to commands from a vocabulary of commands and then executes the commands. The hub 104 may require additional input from a user when responding to the command, for example "high, for 60 seconds" in this example.

In the illustrated example, the hub 104 is connected to other home devices by a home device network. Examples of other home devices include lighting 105, television 106 and other audio/video and entertainment devices, powered window and door treatments 107, powered furniture or furnishings, a thermostat and other environmental controls and HVAC devices, a refrigerator 109, a microwave 110 and other kitchen appliances, bathroom appliances, and home robotic devices. The hub 104 in this example is separate from and can be communicatively coupled to one or more of the devices, via a network (not shown). The network may be a wireless or a wired network that is implemented using various technologies.

The command hub 104 includes a microphone 140, a voice command module 150, a speaker 160. The voice command module 150 includes a wake-up detection module 152, a speech recognition module 154, a command logic 156, a command store 158, an intent recognition module 162, and an intent store 164, all of which are further described below. The command hub 104 may further include one or more sensors (not shown) such as a motion sensor, a camera, a $CO_2$ sensor, a fingerprint scanner and/or reader, an iris scanner and/or reader, and the like. The sensors can be separate from the command hub 104 and connected to the command hub 104 by the home device network.

The microphone 140 receives audio input such as users' voice input and converts the received audio input into electrical signals. A user speaks to the hub 104 and the microphone 140 captures the user's utterance. In a sleep mode, the microphone 140 is still on and captures sound surrounding the hub 104. The captured sound is buffered for a time period. The hub 104 may further include other input components to receive input from a user, such as a button, a keyboard, a touchscreen, a touchpad, a motion sensor, or a camera.

The wake-up detection module 152 recognizes wake-up utterances. The wake-up detection module 152 employs speech or phrase recognition techniques to interpret voice input to detect wake-up utterances. For example, the wake-up detection module 152 may employ a model that represents the wake-up utterance. In some embodiments, the model is based on spectrograms. In other embodiments, the model is a phone model representing a sequence of phones uttered by the user. The model may be developed using the user's utterances of the wake-up utterance. In addition, the model may be based on a generic model that is trained using training data such as utterances of the wake-up utterance by users. The wake-up detection module 152 analyzes users' voice input in reference to the model to detect whether a user has uttered the wake-up utterance. When the wake-up detection module 152 detects a wake-up utterance, the wake-up detection module 152 triggers the command hub 104 to exit the low power mode by turning on one or more modules that are off in the low power mode.

In some embodiments, the wake-up detection module 152 verifies user identities. The command hub 104 responds to only authorized users. That is, the command hub 104 does not respond to users whose identities are unknown even when the users have uttered the wake-up utterances used by authorized users to activate the hub 104. As one example, for a particular wake-up command, the command hub 104 responds only if one or a few authorized users utter the wake-up utterance. In other embodiments, the command hub 104 responds to anyone that utters a particular wake-up utterance.

The wake-up detection module 152 verifies a user's identity, for example, using characteristics of the voice input. As one example, the wake-up detection module 152 determines a voice print of an audio signal output by the microphone and compares the determined voice print to voice prints associated with authorized users to verify a user's identity. A voice print includes features representing characteristics of an individual's voice and utterance. A feature can be a temporal feature or a spectral feature. Acoustic features (e.g., voice pitch, frequency, or tone) and/or speaking patterns (e.g., emphasizing or omitting a particular phone or syllable, a pause time between phones or syllables, etc.) are example features. The wake-up detection module 152 determines and compares voice prints using technologies such as frequency estimation, hidden Markov models, Gaussian mixture models, pattern matching algorithms, neural networks, matrix representation, vector quantization, and decision trees.

In some embodiments, the wake-up detection module 152 is located in a zone of the residential environment and determines if the individual 102 is located in or in proximity to the zone. The wake-up detection module 152 wakes up the hub 104, if the individual 102 is in the zone. In some embodiments, the wake-up detection module 152 wakes up a group of home devices that are also in the zone. A zone corresponds to a physical area and includes devices physically located in the physical area. In the illustrated example, the house 100 is divided into three zones 120, 122, and 124 that correspond to a kitchen, a bedroom and a living room. The kitchen zone 120 includes the refrigerator 109 and the microwave 110. The living room zone 122 includes powered window treatments 107. The bedroom zone 124 includes a lamp 105 and TV 106. The wake-up detection module 152 determines the individual's 102 location relative to the command hub 104 and compares the location to the physical area to determine if the individual 102 is in a particular zone. The wake-up detection module 152 may use various technologies such as beamforming techniques and/or time-of-flight techniques to determine an individual's location.

The intent recognition module 162 recognizes users' intent to take some actions before the users take those actions. As described herein, a user's intent is an action that the user is likely to take within a predetermined time period. For example, if a user intends to customize a wake-up utterance, the intent recognition module 162 recognizes the user's intent before the user requests to customize a wake-up utterance. As another example, if a user intends to interact with the command hub 104, the intent recognition module 162 recognizes the user's intent before the user instructs the command hub 104 to wake up. As a further example, if a user is likely to intend to adjust the temperature, the intent recognition module 162 recognizes the user's intent before the user adjusts the temperature.

A user's intent can be determined using data received from various sensors that are included in or coupled to the voice command module 150. The intent recognition module 162 analyzes the data to determine a user's intent. In some embodiments, the data are analyzed to detect events and the user's intent can be determined from the detected events. In some embodiments, a user's intent is determined using associations of intent to events and/or to data received from the sensors. Events are determined using associations of events to data received from the sensors. The associations include general associations that are applicable to all users and user-specific associations that are applicable to one or more particular users. Users' identity can also be determined from the data received from the sensors. A user's identity can be determined from images or videos captured by a camera, for example, by using image or face recognition techniques. A user's identity can also be determined from their voice prints as described above. A user's identity can also be determined from their finger prints and/or irises. The associations are stored in the intent store 164. User-specific associations are stored with the users.

For example, when a user is detected to be reaching to press a button to configure a new wake-up utterance, the intent recognition module 162 determines that the user is likely to configure a new wake-up utterance. Data such as output of a camera and/or a motion sensor is used to recognize the user's intent. As another example, when a user is detected to have entered an empty house, the intent recognition module 162 determines that the user is likely to interact with the command hub 104. Data such as output of a camera at the entrance, a motion sensor near the door, and/or a microphone is used to recognize the user's intent. As a further example, when a particular user stays in a room for 15 mins, the intent recognition module 162 recognizes that the user is likely to intend to adjust the temperature and lighting in the room. Data such as output of a motion sensor, a $CO_2$ sensor, a microphone, and/or a camera in the room can be used to determine the user's identity and the user's intent. As a further example, when a particular user approaches a home device such as an air conditioner, the intent recognition module 162 determines that the user is likely to interact with the air conditioner. Data such as output of a camera in the same room as the air conditioner, a $CO_2$ sensor, a microphone, and/or a camera can be used to determine the user's identity and the user's intent.

The intent recognition module 162 generates commands based on the determined intent. A command triggers the command hub 104 and/or a home device to respond corresponding to the intended action. The command will be generated if the user takes the intended action. Accordingly, the command hub 104 and/or the home device respond as if the user has taken the intended action before the user does so. The command can also trigger the command hub 104 and/or a home device to respond by confirming with the user on the determined intent. For example, if a user is likely to configure a new wake-up utterance, the intent recognition module 162 generates a command to trigger the command hub 104 to ask the user whether the user wants to configure a new wake-up utterance. As another example, if a user is likely to interact with the command hub 104, the intent recognition module 162 generates a wake-up command. As such, the command hub 104 will respond to the user if the user utters commands without uttering the wake-up utterance. As a further example, if the user is likely to adjust the temperature, the intent recognition module 162 generates a command to adjust the temperature according to the user's preference. As yet another further example, if the user is likely to interact with the air conditioner, the intent recognition module 162 generates a command to present a user interface with relevant options for presentation to the user such that the user does not need to manually trigger the air conditioner to respond.

The speech recognition module 154 interprets users' utterance to recognize commands. It typically converts utterances to commands from a predetermined vocabulary of commands. In one implementation, the speech recognition module 154 identifies words in a user's utterance in order to identify a command. The command store 158 stores associations between utterances and commands. The speech recognition module 154 may employ large vocabulary speech recognition techniques to interpret users' utterance. Compared to the wake-up detection module 152 that identifies only a particular wake-up command, the speech recognition module 154 performs more computationally-intensive operations. In some embodiments, when the device is in the sleep mode, the speech recognition module 154 is off and the speech recognition module 154 recognizes commands only when the hub 104 is activated. When the command hub 104 is activated from the sleep mode, the speech recognition module 154 processes the user's utterance that were previously buffered as well as a user's utterance that is currently being captured, because a wake-up command may appear before or after a command. In some embodiments, functionalities of the speech recognition module 154 may be completely or partially provided by a cloud-based service. The hub 104 provides users' utterance to one or more servers providing the cloud-based service for processing.

The command logic 156 receives the commands from the speech recognition module 154 and/or the intent recognition module 162 and executes the commands. One of the possible commands is a customization command to define a new wake-up utterance for the wake-up command. The default wake-up utterance might be "Computer" and now the user wants to change the utterance to "Gort." The command logic 156 executes the customization command for users. When a user requests to customize a wake-up utterance for the hub 104, the user utters the customization command followed by the new wake-up utterance corresponding to the wake-up command. The command hub 104 captures the user's utterance. In some embodiments, the command logic 156 identifies the new wake-up utterance from the user's utterance and stores a representation of the new wake-up utterance in the command store 158 for future wake-up detection.

Wake-up utterances can be customized in different ways. For example, different users can configure the command hub 104 to use different wake-up utterances for the users. In some embodiments, the command logic 156 associates a recognized wake-up utterance only with those users that performed the set up to use that wake-up utterance. For example, Edmund and Harry both use "Gort" as the utterance that triggers the wake-up command, and Michael uses "Dolores" to trigger the wake-up command. The command logic 156 associates the wake-up utterance "Gort" with Edmund and Harry and associates the wake-up utterance "Dolores" with Michael. Users are identified by their unique user IDs. Alternately, the command hub 104 may be configured so that all users use the same wake-up utterance(s). For example, if Michael configured the hub most recently, then the wake-up utterance may be "Dolores" for all users. Alternately, both "Gort" and "Dolores" could be detected as wake-up utterances.

The command logic 156 may create a model that represents the utterance of the wake-up command, which is used by the wake-up detection module 152 to recognize the wake-up command. The command logic 156 may obtain a model that represents a wake-up utterance trained offline using training data, for example, from a cloud service. In some embodiments, the model includes an utterance model that represents the user's utterance of the wake-up command. The wake-up utterance model includes features representing characteristics of the user's utterance of the wake-up command such as phones, phone sequences, phonetic distances, phonemes, transitions between phonemes, diphones, triphones, and syllables. The features may further include features representing characteristics of the user's voice as further described below. The command logic 156 may update the model using the user's additional utterance of the wake-up command and/or updated training data. The model is associated with the user and stored in the command store 158.

In some embodiments, the command logic 156 further develops voice prints for users. The command logic 156 creates a voice print for a user as the user speaks. For example, the command logic 156 instructs the user to speak freely (text independent) or as directed (text dependent) to capture characteristics of the user's voice and utterance. In some implementations, after a voice print has been created for a user, the command logic 156 further updates the voice print using additional samples that are available as the user interacts with the command hub 104.

In some implementations, the command logic 156 evaluates whether new wake-up utterances are likely to cause confusion. A wake-up utterance is likely to cause confusion if the command hub 104 is likely to wake up unintendedly or is unlikely to wake up as desired by users. For example, a wake-up utterance that is frequently used, sounds similar to another word, or has already been used to represent a different command, is likely to cause confusion. In one approach, the command logic 156 calculates a score to evaluate a likelihood of confusion based on one or more factors such as a predefined use, a frequency of use, or a degree of phonetic similarity.

The predefined use can be determined by looking up existing commands. For example, if "Gort" has already been coded as a command for turning on a microwave, then using it as a wake-up utterance for the command hub 104 is likely to cause confusion. The frequency of use can be determined from English or other language corpora or from monitoring a particular user's use. The degree of phonetic similarity can be determined by comparing the pronunciation of a word including the pronunciation of partial syllables of the word to pronunciations of other words including partial pronunciations. If a wake-up utterance is likely to cause confusion, the command logic 156 alerts the user and confirms with the user before setting up to use the wake-up utterance. Alternatively, the command logic 156 prompts the user to choose a different wake-up utterance if the wake-up utterance is likely to cause confusion. The command logic 156 updates the wake-up utterance stored in the command store 158 when a user requests to update the wake-up utterance. The process of updating wake-up utterances is similar to the process of creating wake-up utterances as described above.

In some embodiments, the command logic 156 checks if an input word is a disparaging word or other forbidden word and prompts the user to use a different wake-up utterance instead.

In some embodiments, a particular command hub is associated with a particular wake-up utterance. The command logic 156 stores a particular user's wake-up utterance in the command store 158. In some embodiments, for a particular command hub, different users can configure to use different wake-up utterances. The command logic 156 associates a wake-up utterance with a corresponding user and stores the wake-up utterance and the association in the command store 158.

In some embodiments, a user configures that a group of devices is activated by the same wake-up command. The user configures one device of the group using the process as described above. In some embodiments, the command logic 156 associates the wake-up command with the group of devices. When the hub 104 itself wakes up, the hub 104 triggers the other devices of the group to wake up, for example, by sending a wake-up signal to the other devices. In some embodiments, the command logic 156 distributes the wake-up utterance to the group of devices. The group of devices may be in the same zone. The user can configure that waking up one device of the group wakes up all devices in the group. When a user updates a group to include a new device or to remove an existing device, the command logic 156 extends the wake-up utterance to the new device or removes the wake-up utterance configuration from the device that is removed.

Returning to FIG. 1, the speaker 160 outputs sounds to users indicating different meanings such as alerts, warnings, confirmation, instructions, and the like. As such, users interact with the voice controller hub 104 via speech. The command hub 104 may include additional or alternative output interfaces such as a display or a vibrating element.

In the illustrated example, the voice command module 150 is implemented in a command hub 104 that is a stand-alone device. The voice command module 150 and its components may also be implemented in a mobile device (e.g., a smart phone, a tablet, or a laptop), a desktop, or a virtual assistant. It may also be integrated with or implemented as home devices, such as those described above.

Figure 2:
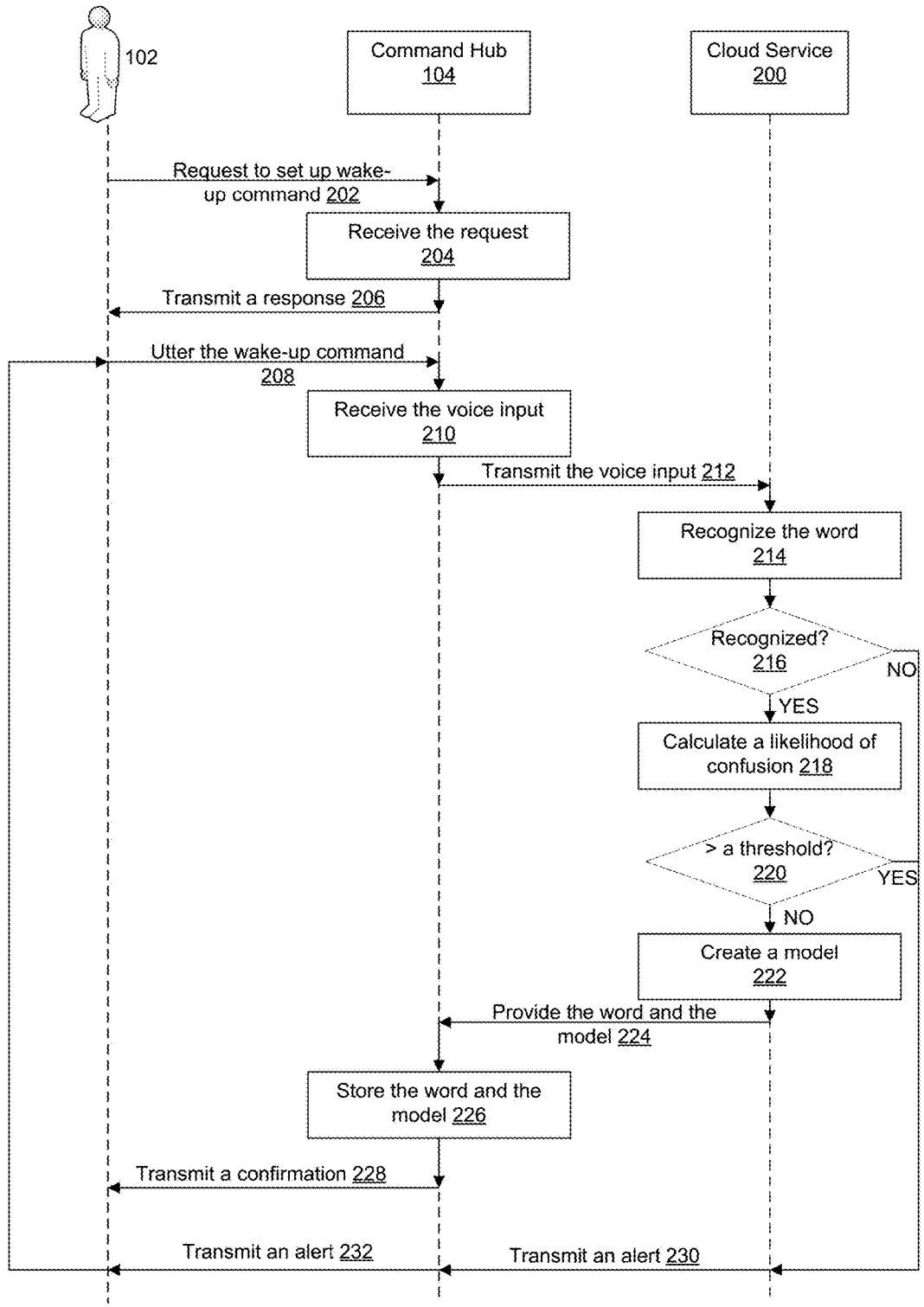
FIG. 2 illustrates an example process of configuring customizable wake-up commands, according to one embodiment.

FIG. 2 illustrates an example process of configuring customizable wake-up commands, according to one embodiment. Edmund 102 requests 202 to set up or change the wake-up utterance for the command hub 104. A user can request to set up a wake-up utterance in a variety of ways, depending on devices' capabilities and configuration. For example, the user issues a voice command "configure wake-up command," presses a button, or clicks on "configure wake-up command" displayed on the user's cell phone. The hub 104 receives 204 the request from Edmund 102. In some embodiments, the hub 104 initializes in a state ready for configuring wake-up commands. For example, the hub 104 checks if it is connected to the cloud service 200 and, if not, identifies whether a user's identity is known and assigns the user with a user ID if the user is unknown, etc. The hub 104 transmits 206 a response to Edmund to indicate that the hub 104 is ready to configure wake-up commands. The response can be a sound, a light indication, a vibration, a visual display, and other formats depending on configurations of the hub 104. Edmund 102 says 208 "Gort." In some implementations, the hub 104 directs a user to repeat the wake-up utterance several times.

The hub 104 receives 210 the voice input that is Edmund's utterance. The device transmits 212 the received voice input to a cloud service 200. The cloud service 200 processes the received voice input as further described below. In this example, the cloud service 200 recognizes 214 the word(s) (e.g., "Gort"), for example, by using large-vocabulary speech recognition techniques. The cloud service 200 may use techniques such as hidden Markov models, deep feedforward neural networks, or other large-vocabulary speech recognition models to identify one or more words spoken by the user. The cloud service 200 checks 216 if any word is identified.

For the identified word, the cloud service 200 calculates a likelihood of confusion 218 that reflects a likelihood of the command hub 104 being activated unintendedly or being unable to activate as desired by users. If a wake-up utterance has been coded for use in other commands or is frequently used in daily conversations, the use of it is likely to activate a command hub 104 unintendedly. If a wake-up utterance sounds similar to another word, the use of it is likely to cause the command hub 104 not to activate as desired. The cloud service 200 compares 220 the calculated likelihood to a threshold to determine whether the user's choice is likely to cause confusion. If the choice is determined to be unlikely to cause confusion, the cloud service 200 creates 222 a model representing the user's utterance of the word. The model may be generic and developed using training data such as utterances of the wake-up command by a large number of speakers. The model may represent a particular user's utterance. The cloud service 200 provides 224 the recognized utterance and the model to the command hub 104. The command hub 104 stores 226 this. The command hub 104 uses the model for recognition of the wake-up utterance. In some implementations, the cloud service 200 provides only the model to the command hub 104. The hub 104 transmits 228 a confirmation to the user 102 indicating that the wake-up command has been configured successfully. The confirmation can be a sound, a light indication, a vibration, a visual display, and other formats depending on configurations of the hub 104.

In some implementations, the cloud service 200 associates the recognized utterance with the user and with the command hub 104, and stores the association. The cloud service 200 further stores the model created for the user.

If the cloud service 200 determines that no word is recognized or a likelihood of the recognized word is above a threshold such that the word is likely to cause confusion, the cloud service 200 transmits 230 an alert to the command hub 104. In other implementations, the cloud service 200 creates an utterance model 222 based on the user's voice input even if the cloud service 200 determines no word is recognized. The hub 104 transmits 232 an alert to Edmund 102 indicating that the configuration was unsuccessful.

In this example, the cloud service 200 recognizes a word and determines if a word is identified, calculates a likelihood of confusion and determines if a word is likely to cause confusion, and creates a model representing a word and/or the utterance of the word. One or more of these operations can be performed by the command hub 104.

Figure 3:
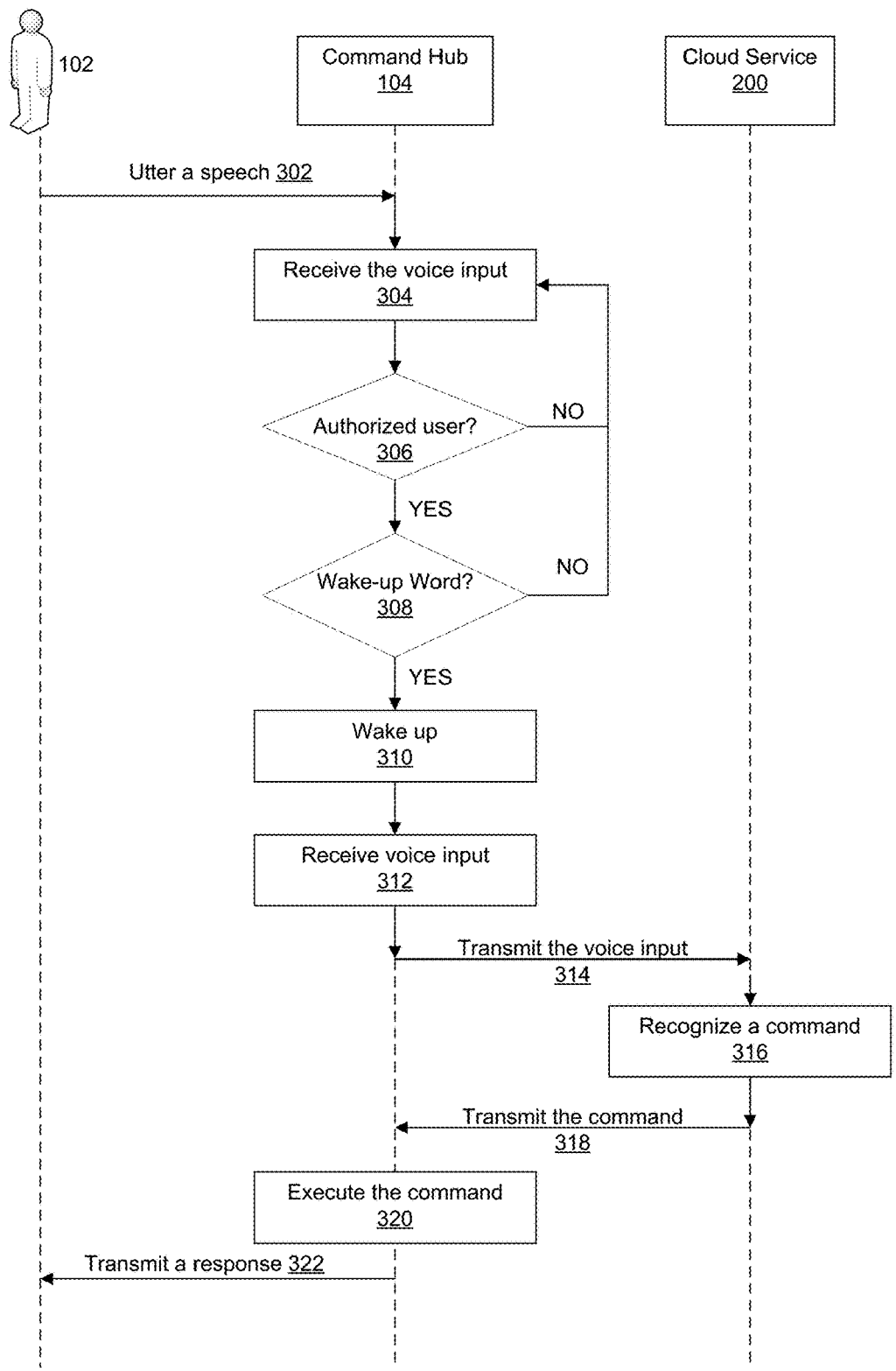
FIG. 3 illustrates activating a voice-controlled home device using a wake-up utterance customized as described herein, according to one embodiment.

FIG. 3 illustrates an example process of activating a command hub 104 using a wake-up utterance customized as described herein, according to one embodiment. For the discussion related to FIG. 3, the command hub 104 is initially in a sleep mode and is not ready to execute voice commands. A user utters 302 some speech. The hub 104 is in a lower power mode but it monitors sound in the surrounding environment. The hub 104 receives 304 the voice input. The voice input is buffered. The hub 104 determines 306 whether the user 102 is an authorized user. For example, the hub 104 determines a voice print using the received voice input and matches the user's voice print against voice prints of users authorized to use the hub 104. When identifying a match, the hub 104 determines that the user is an authorized user. If the user is not an authorized user, the hub 104 continues to monitor sound input in the surrounding environment. In some embodiments, the hub 104 identifies the wake-up command based on the user's identity. The hub 104 looks up the wake-up utterance that corresponds to the user.

If the user 102 is an authorized user, the hub 104 determines 308 whether the user's voice input includes the wake-up utterance. The wake-up command recognition may be performed using one or more speech recognition techniques. In some embodiments, the low power mode, the command hub 104 is configured to recognize only one or more wake-up utterances configured by users authorized to use the hub 104. For example, the command hub 104 uses one or more models that represent the wake-up utterance and/or the user's utterance of the wake-up command such as hidden Markov models, Gaussian mixture models, extensive lexicons, and/or natural language processing algorithms to recognize the wake-up utterance. If no wake-up utterance is recognized, the command hub continues to monitor sound input in the surrounding environment.

If the wake-up command for the user 102 is recognized, the command hub 104 wakes up 310 from the low power mode such that it is activated. The command hub 104 may indicate to the user 102 that it is activated. The command hub 104 may receive 312 additional voice input uttered by the user 102 after the wake-up command is detected. The command hub 104 transmits 314 the voice input to the cloud service 200 for recognition of one or more commands. The transmitted voice input includes the voice input that is uttered within a time period from when the user 102 utters the wake-up command. For example, the user 102 utters "What's the time, Gort? When is my next appointment?" The voice input "What's the time" is transmitted to the cloud service 200 for analysis because it is uttered within a time period from when the wake-up command "Gort" is uttered. The hub 104 transmits the voice input "What's the time" and "When is my next appointment" to the cloud service 200 for analysis.

The cloud service 200 recognizes 316 a command from the received voice input. The cloud service 200 employs speech recognition techniques or natural language processing techniques such as acoustic models or language models that are able to interpret the user's voice input. Continuing the last example, the cloud service 200 recognizes commands "time" and "calendar" from the voice input "What's the time" and "When is my next appointment." The cloud service 200 transmits 318 the recognized command(s) to the hub 104. The hub 104 executes 320 the received commands. The hub 104 transmits 322 a response to the user 102 indicating a requested result or a confirmation. For example, the hub 104 returns the current time and the next event in the calendar to the user 102. If no command is recognized or the hub 104 is unable to execute an identified command, the hub 104 alerts the user accordingly.

Figure 4:
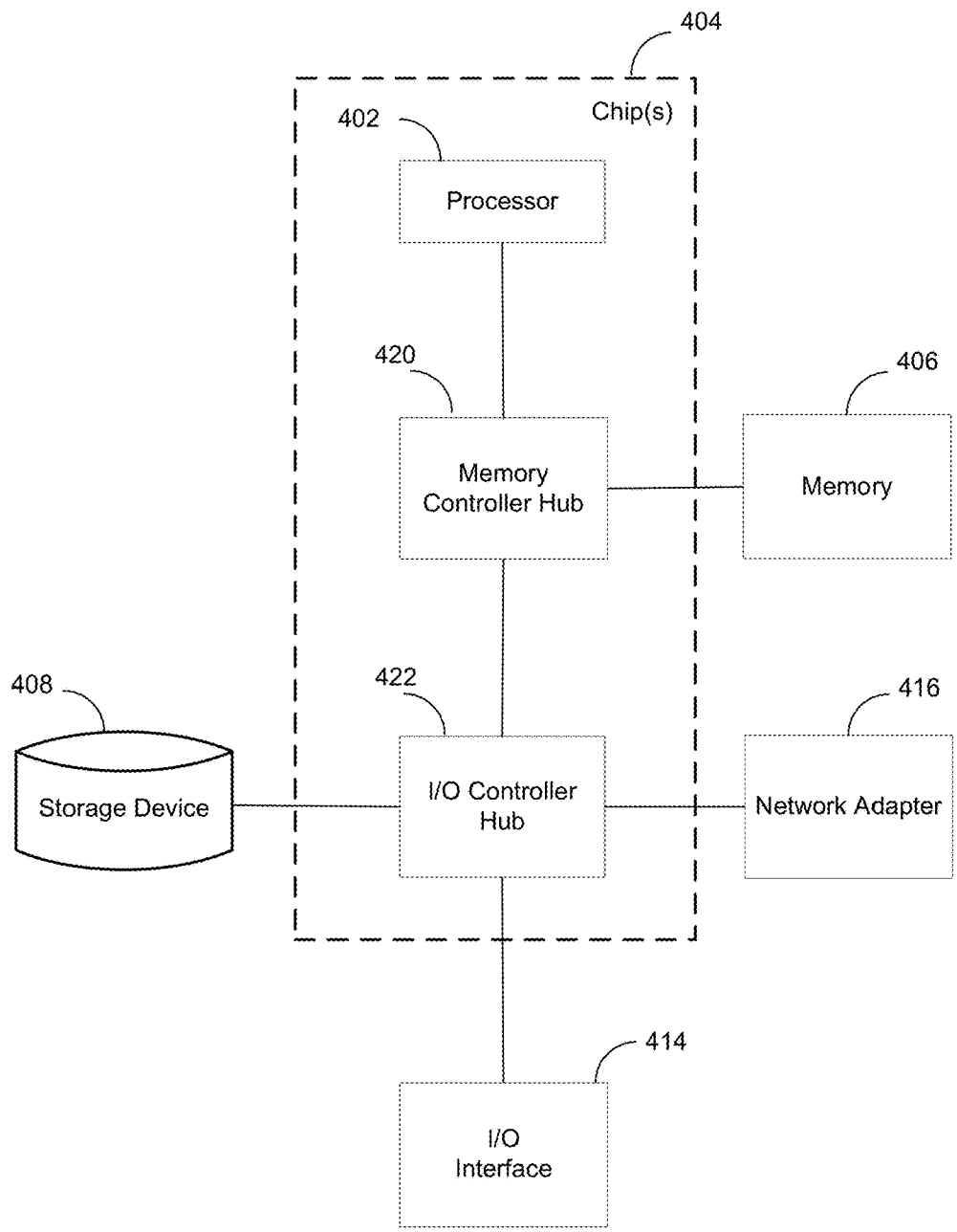
FIG. 4 is a high-level block diagram illustrating an example home device for use as one or more of the entities illustrated in FIG. 1, according to one embodiment.

FIG. 4 is a high-level block diagram illustrating an example device 400 for implementing the components shown in FIG. 1. The device 400 includes a chip/chipset 404 that includes at least one processor 402, a memory controller hub 420 and an input/output (I/O) controller hub 422. A memory 406 is coupled to the memory controller hub 420. A storage device 408, an I/O interface 414 and a network adapter 416 are coupled to the I/O controller hub 422. Other embodiments of the device 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The I/O interface 414 can support devices such as a microphone, a touch-screen interface, a mouse, track ball, or other type of pointing device, a keyboard, or some combination thereof, and is used to input data into the device 400. In some embodiments, the device 400 may be configured to receive input (e.g., commands) from the I/O interface 414 via gestures from the user. The I/O interface can also support output, such as displays and speakers. The network adapter 416 couples the device 400 to one or more computer networks.

The device 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of devices 400 used by the entities of FIG. 1 can vary depending upon the embodiment and the processing power required by the entity. For example, the cloud service can run in a single device 400 or multiple computers 400 communicating with each other through a network such as in a server farm. The computers 400 can lack some of the components described above.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure. For example, the voice command module 150 may be implemented separately in each individual home device, rather than in a central command hub 104. As another example, the wake-up detection module 152 may be implemented as part of the overall speech recognition module 154 and command logic 156, rather than as a separate component.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

What is claimed is:

1. An electronic device, comprising:
   one or more processors; and
   memory including instructions, the instructions, when executed by the one or more processors, cause the processors to perform operations comprising:
   receiving utterances from users and converting the utterances to commands from a vocabulary of predetermined commands, the vocabulary including a customization command to define a new wake-up utterance corresponding to a wake-up command;
   receiving a first utterance from a first user;
   in response to receiving the first utterance from the first user, and in accordance with a determination that the first utterance corresponds to the customization command to define a new wake-up utterance corresponding to the wake-up command, providing a first response to the first user;
   after providing the first response to the user, capturing a second utterance from the first user; and
   in response to receiving the second utterance from the first user:
   determining a likelihood of confusion for using the second utterance as the new wake-up utterance corresponding to the wake-up command, based at least in part on a frequency of use of the second utterance in a first selected corpus;
   in accordance with a determination that the likelihood of confusion for using the second utterance as the new wake-up utterance corresponding to the wake-up command is below a threshold, setting the second utterance as the new wake-up utterance corresponding to the wake-up command; and
   in accordance with a determination that the likelihood of confusion for using the second utterance as the new wake-up utterance corresponding to the wake-up command is above the threshold, generating an alert to the first user.

2. The electronic device of claim 1, wherein the electronic device is a hub for a home device network that executes commands for one or more home devices on the home device network, and the wake-up command wakes up the hub.

3. The electronic device of claim 1, wherein the electronic device is capable of converting different wake-up utterances from different users to the same wake-up command, wherein the different wake-up utterances for the different users include a first wake-up utterance defined by the first user and a second wake-up utterance defined by a second user distinct from the first user, and the first wake-up utterance and the second wake-up utterance corresponds to completely distinct text.

4. The electronic device of claim 1, wherein the wake-up command wakes up a group of home devices corresponding to a first location-based zone, the group of home devices including a first device that is initially waken up by the wake-up command, and including one or more second home devices that are also in the first location-based zone and that receive the wake-up command from the first device.

5. The electronic device of claim 4, wherein the operations further include:
   detecting a user input adding a new home device to the group of home devices corresponding to the first location-based zone; and
   after detecting the user input adding the new home device to the group of home devices corresponding to the first location-based zone, automatically extending the wake-up command to to wake up the new home device added to the group of home devices in accordance with a determination that one of the group of home devices corresponding to the first location-based zone has received the new wake-up utterance.

6. The electronic device of claim 1, wherein the operations further include:
transmitting voice input recorded within an input buffer to a wake-up detection module;
detecting the new wake-up utterance in the voice input; and
transmitting a segment of the voice input in the input buffer that was recorded before the new wake-up utterance to a server for user intent determination.

7. The electronic device of claim 1, wherein determining the likelihood of confusion for using the second utterance as the new wake-up utterance corresponding to the wake-up command is further based on whether the second utterance is currently used as one of the predetermined commands of the vocabulary.

8. The electronic device of claim 1, wherein determining the likelihood of confusion for using the second utterance as the new wake-up utterance corresponding to the wake-up command is further based on a degree of phonetic similarity with other utterances.

9. A non-transitory computer-readable storage medium, including instructions, the instructions, when executed by one or more processors of an electronic device, cause the processors to perform operations comprising:
receiving utterances from users and converting the utterances to commands from a vocabulary of predetermined commands, the vocabulary including a customization command to define a new wake-up utterance corresponding to a wake-up command;
receiving a first utterance from a first user;
in response to receiving the first utterance from the first user, and in accordance with a determination that the first utterance corresponds to the customization command to define a new wake-up utterance corresponding to the wake-up command, providing a first response to the first user;
after providing the first response to the user, capturing a second utterance from the first user; and
in response to receiving the second utterance from the first user:
determining a likelihood of confusion for using the second utterance as the new wake-up utterance corresponding to the wake-up command, based at least in part on a frequency of use of the second utterance in a first selected corpus;
in accordance with a determination that the likelihood of confusion for using the second utterance as the new wake-up utterance corresponding to the wake-up command is below a threshold, setting the second utterance as the new wake-up utterance corresponding to the wake-up command; and
in accordance with a determination that the likelihood of confusion for using the second utterance as the new wake-up utterance corresponding to the wake-up command is above the threshold, generating an alert to the first user.

10. The computer-readable storage medium of claim 9, wherein the electronic device is a hub for a home device network that executes commands for one or more home devices on the home device network, and the wake-up command wakes up the hub.

11. The computer-readable storage medium of claim 9, wherein the electronic device is capable of converting different wake-up utterances from different users to the same wake-up command, wherein the different wake-up utterances for the different users include a first wake-up utterance defined by the first user and a second wake-up utterance defined by a second user distinct from the first user, and the first wake-up utterance and the second wake-up utterance corresponds to completely distinct text.

12. The computer-readable storage medium of claim 9, wherein the wake-up command wakes up a group of home devices corresponding to a first location-based zone, the group of home devices including a first device that is initially waken up by the wake-up command, and including one or more second home devices that are also in the first location-based zone and that receive the wake-up command from the first device.

13. The computer-readable storage medium of claim 12, wherein the operations further include:
detecting a user input adding a new home device to the group of home devices corresponding to the first location-based zone; and
after detecting the user input adding the new home device to the group of home devices corresponding to the first location-based zone, automatically extending the wake-up command to wake up the new home device added to the group of home devices in accordance with a determination that one of the group of home devices corresponding to the first location-based zone has received the new wake-up utterance.

14. The computer-readable storage medium of claim 9, wherein the operations further include:
transmitting voice input recorded within an input buffer to a wake-up detection module;
detecting the new wake-up utterance in the voice input; and
transmitting a segment of the voice input in the input buffer that was recorded before the new wake-up utterance to a server for user intent determination.

15. The computer-readable storage medium of claim 9, wherein determining the likelihood of confusion for using the second utterance as the new wake-up utterance corresponding to the wake-up command is further based on whether the second utterance is currently used as one of the predetermined commands of the vocabulary.

16. The computer-readable storage medium of claim 9, wherein determining the likelihood of confusion for using the second utterance as the new wake-up utterance corresponding to the wake-up command is further based on a degree of phonetic similarity with other utterances.

17. A method, comprising:
receiving utterances from users and converting the utterances to commands from a vocabulary of predetermined commands, the vocabulary including a customization command to define a new wake-up utterance corresponding to a wake-up command;
receiving a first utterance from a first user;
in response to receiving the first utterance from the first user, and in accordance with a determination that the first utterance corresponds to the customization command to define a new wake-up utterance corresponding to the wake-up command, providing a first response to the first user;
after providing the first response to the user, capturing a second utterance from the first user; and
in response to receiving the second utterance from the first user:
determining a likelihood of confusion for using the second utterance as the new wake-up utterance corresponding to the wake-up command, based at least in part on a frequency of use of the second utterance in a first selected corpus;

in accordance with a determination that the likelihood of confusion for using the second utterance as the new wake-up utterance corresponding to the wake-up command is below a threshold, setting the second utterance as the new wake-up utterance corresponding to the wake-up command; and in accordance with a determination that the likelihood of confusion for using the second utterance as the new wake-up utterance corresponding to the wake-up command is above the threshold, generating an alert to the first user.

18. The method of claim 17, wherein the electronic device is a hub for a home device network that executes commands for one or more home devices on the home device network, and the wake-up command wakes up the hub.

19. The method of claim 17, wherein the electronic deviceis capable of converting different wake-up utterances from different users to the same wake-up command, wherein the different wake-up utterances for the different users include a first wake-up utterance defined by the first user and a second wake-up utterance defined by a second user distinct from the first user, and the first wake-up utterance and the second wake-up utterance corresponds to completely distinct text.

20. The method of claim 17, wherein the electronic device is capable of converting different wake-up utterances to wake-up commands for different home devices.

21. The method of claim 17, wherein the wake-up command wakes up a group of home devices corresponding to a first location-based zone, the group of home devices including a first device that is initially waken up by the wake-up command, and including one or more second home devices that are also in the first location-based zone and that receive the wake-up command from the first device.

22. The method of claim 21, wherein the operations further include:
   detecting a user input adding a new home device to the group of home devices corresponding to the first location-based zone; and
   after detecting the user input adding the new home device to the group of home devices corresponding to the first location-based zone, automatically extending the wake-up command to wake up the new home device added to the group of home devices in accordance with a determination that one of the group of home devices corresponding to the first location-based zone has received the new wake-up utterance.

23. The method of claim 22, wherein the operations further include:
   transmitting voice input recorded within an input buffer to a wake-up detection module;
   detecting the new wake-up utterance in the voice input; and
   transmitting a segment of the voice input in the input buffer that was recorded before the new wake-up utterance to a server for user intent determination.

24. The method of claim 17, wherein determining the likelihood of confusion for using the second utterance as the new wake-up utterance corresponding to the wake-up command is further based on whether the second utterance is currently used as one of the predetermined commands of the vocabulary.

25. The method of claim 17, wherein determining the likelihood of confusion for using the second utterance as the new wake-up utterance corresponding to the wake-up command is further based on a degree of phonetic similarity with other utterances.

* * * * *